(12) United States Patent
Lasserre et al.

(10) Patent No.: US 11,323,714 B2
(45) Date of Patent: May 3, 2022

(54) METHOD AND DEVICE FOR CONTEXT-ADAPTIVE BINARY ARITHMETIC CODING A SEQUENCE OF BINARY SYMBOLS REPRESENTING A SYNTAX ELEMENT RELATED TO VIDEO DATA

(71) Applicant: INTERDIGITAL VC HOLDINGS, INC., Wilmington, DE (US)

(72) Inventors: Sebastien Lasserre, Thorigné Fouillard (FR); Pierre Andrivon, Liffre (FR); Philippe Bordes, Laille (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 192 days.

(21) Appl. No.: 16/300,575

(22) PCT Filed: May 5, 2017

(86) PCT No.: PCT/EP2017/060759
§ 371 (c)(1),
(2) Date: Nov. 11, 2018

(87) PCT Pub. No.: WO2017/194401
PCT Pub. Date: Nov. 16, 2017

(65) Prior Publication Data
US 2020/0314430 A1    Oct. 1, 2020

(30) Foreign Application Priority Data
May 12, 2016    (EP) .................................... 16305554

(51) Int. Cl.
*H04N 19/13*    (2014.01)
*H04N 19/70*    (2014.01)
(Continued)

(52) U.S. Cl.
CPC ............. *H04N 19/13* (2014.11); *G06F 17/18* (2013.01); *H04N 19/70* (2014.11); *H04N 19/91* (2014.11)

(58) Field of Classification Search
CPC ........ H04N 19/13; H04N 19/70; H04N 19/91; G06F 17/18
See application file for complete search history.

(56) References Cited

U.S. PATENT DOCUMENTS

| 7,286,710 B2 | 10/2007 | Marpe et al. |
| 2012/0314760 A1 | 12/2012 | He |

(Continued)

FOREIGN PATENT DOCUMENTS

| CN | 101005287 A | 7/2007 |
| CN | 101848387 A | 9/2010 |

(Continued)

OTHER PUBLICATIONS

Alshin et al., "High Precision Probability Estimation for CABAC," published to IEEE on Jan. 9, 2014.*
Wikipedia's Entry on "CABAC", accessed on Jan. 14, 2021, available at https://en.wikipedia.org/wiki/Context-adaptive_binary_arithmetic_coding.*

(Continued)

*Primary Examiner* — Michael J Hess
(74) *Attorney, Agent, or Firm* — Invention Mine LLC

(57) ABSTRACT

The present principles relate to a method and device for context-adaptive binary arithmetic coding a sequence of binary symbols representing a syntax element related to video data or a syntax element relative to a video data. The method comprises, for each binary symbol of the sequence of binary symbols:—obtaining (100) a context value from a context model defined for the binary symbol, said context value comprising bits representing the probability, called a first probability p, for the binary symbol to be equal to a (Continued)

binary value;—determining (110) a second probability p' by modifying said first probability p according to at least one previously coded binary symbol of the sequence of binary symbols;—arithmetic coding (120) the binary symbol based on said second probability p'; and—updating and storing (130) the first probability p of said context value

21 Claims, 8 Drawing Sheets

(51) Int. Cl.
    *G06F 17/18*      (2006.01)
    *H04N 19/91*      (2014.01)

(56) References Cited

U.S. PATENT DOCUMENTS

| | | | | |
|---|---|---|---|---|
| 2013/0136375 | A1* | 5/2013 | Sasai | H04N 19/136 382/238 |
| 2014/0334538 | A1* | 11/2014 | Okawa | H04N 19/46 375/240.03 |
| 2015/0195538 | A1 | 7/2015 | Henry et al. | |
| 2016/0373788 | A1* | 12/2016 | Gamei | H04N 19/91 |
| 2017/0339413 | A1* | 11/2017 | Alshin | H04N 19/13 |

FOREIGN PATENT DOCUMENTS

| | | |
|---|---|---|
| CN | 105338353 A | 2/2016 |
| EP | 0913035 B1 | 12/2001 |
| EP | 2533538 A3 | 3/2013 |
| IN | 201302118 A1 | 10/2014 |
| JP | 2014523186 A | 9/2014 |
| KR | 281322 B1 | 2/2001 |
| KR | 20130002298 A | 1/2013 |
| WO | WO 2011008243 A1 | 1/2011 |
| WO | WO 2012167097 A1 | 12/2012 |
| WO | WO 2015188297 A1 | 12/2015 |

OTHER PUBLICATIONS

Auli Llinas, F., "Local average-based model of probabilities for JPEG2000 bitplane coder", 2010 Data Compression Conference, Snowbird, Utah, USA, Mar. 24, 2010, pp. 59-68.
Adaptive Probability Update for Non-Coded Syntax.
Qing et al., "Improving Distributed Video Coding by Exploiting Context-Adaptive Modeling", IEEE International Conference on Multimedia and Expo (ICME), Chengdu, China, Jul. 14, 2014, pp. 1-6.
Sole et al., "Transform Coefficient Coding in HEVC", IEEE Transactions on Circuits and Systems for Video Technology, vol. 22, No. 12, Dec. 2012, pp. 1765-1777.
Sze et al., "High Throughput CABAC Entropy Coding in HEVC", IEEE Transactions on Circuits and Systems for Video Technology, vol. 22, No. 12, Dec. 2012, pp. 1778-1791.
Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.
Anonymous, "Advanced video coding for generic audiovisual Services", ITU-T H.264, Telecommunication Standardization Sector of ITU, Series H: Audiovisual and Multimedia Systems, Infrastructure of audiovisual services—Coding of moving video, Feb. 2014, pp. 1-790.
Nguyen et al., "CE11: Evaluation of Transform Coding tools in HE configuration", Joint Collaborative Team on Video COding (JCT-VC) of ITU-T SG16 WP3 and ISO/IEC JTC1/SC29/WG11, Document JCTVC-D061, 4th Meeting, Daegu Korea, Jan. 20, 2011, pp. 1-3.
Chen et al., "Further improvements to HMKTA-1.0", ITU—Telecommunications Standardization Sector, Study Group 16, Question 6, Video Coding Experts Group (VCEG), Document VCEG-AZ07 v2, 52nd Meeting, Warsaw, Poland, Jun. 19, 2015, 9 pages.
Wang W., et al. "A CABAC Accelerating Algorithm Based on Adaptive Probability Estimation Update." In 2009 2nd International Congress on Image and Signal Processing, pp. 1-5. IEEE, 2009.

* cited by examiner

| pStateIdx    | 0  | 1  | 2  | 3  | 4  | 5  | 6  | 7  | 8  | 9  | 10 | 11 | 12 | 13 | 14 | 15 |
|--------------|----|----|----|----|----|----|----|----|----|----|----|----|----|----|----|----|
| transIdxLps  | 0  | 0  | 1  | 2  | 2  | 4  | 4  | 5  | 6  | 7  | 8  | 9  | 9  | 11 | 11 | 12 |
| transIdxMps  | 1  | 2  | 3  | 4  | 5  | 6  | 7  | 8  | 9  | 10 | 11 | 12 | 13 | 14 | 15 | 16 |
| pStateIdx    | 16 | 17 | 18 | 19 | 20 | 21 | 22 | 23 | 24 | 25 | 26 | 27 | 28 | 29 | 30 | 31 |
| transIdxLps  | 13 | 13 | 15 | 15 | 16 | 16 | 18 | 18 | 19 | 19 | 21 | 21 | 22 | 22 | 23 | 24 |
| transIdxMps  | 17 | 18 | 19 | 20 | 21 | 22 | 23 | 24 | 25 | 26 | 27 | 28 | 29 | 30 | 31 | 32 |
| pStateIdx    | 32 | 33 | 34 | 35 | 36 | 37 | 38 | 39 | 40 | 41 | 42 | 43 | 44 | 45 | 46 | 47 |
| transIdxLps  | 24 | 25 | 26 | 26 | 27 | 27 | 28 | 29 | 29 | 30 | 30 | 30 | 31 | 32 | 32 | 33 |
| transIdxMps  | 33 | 34 | 35 | 36 | 37 | 38 | 39 | 40 | 41 | 42 | 43 | 44 | 45 | 46 | 47 | 48 |
| pStateIdx    | 48 | 49 | 50 | 51 | 52 | 53 | 54 | 55 | 56 | 57 | 58 | 59 | 60 | 61 | 62 | 63 |
| transIdxLps  | 33 | 33 | 34 | 34 | 35 | 35 | 35 | 36 | 36 | 36 | 37 | 37 | 37 | 38 | 38 | 63 |
| transIdxMps  | 49 | 50 | 51 | 52 | 53 | 54 | 55 | 56 | 57 | 58 | 59 | 60 | 61 | 62 | 62 | 63 |

FIG.5

METHOD AND DEVICE FOR CONTEXT-ADAPTIVE BINARY ARITHMETIC CODING A SEQUENCE OF BINARY SYMBOLS REPRESENTING A SYNTAX ELEMENT RELATED TO VIDEO DATA

This application claims the benefit, under 35 U.S.C. § 365 of International Application PCT/EP2017/060759, filed May 5, 2017, which was published in accordance with PCT Article 21(2) on Nov. 16, 2017, in English, and which claims the benefit of European patent application No. 16305554.4, filed May 12, 2016.

1. FIELD

The present principles generally relate to picture/video encoding and decoding. Particularly, the technical field of the present principles are related to context-adaptive binary arithmetic coding a sequence of binary symbols representing video data or syntax elements required for decoding said video data.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, video data contains one or several arrays of samples (pixel values) in a specific picture/video format which specifies all information relative to the pixel values of a picture (or a video) and all information which may be used by a display and/or any other device to visualize and/or decode a picture (or video) for example. A still picture (or a picture of a video) comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is a video data that may be represented by a vector of C values, where C is the number of components. Each value of a vector is represented with a number of bits which defines a maximal dynamic range of the pixel values.

Generally speaking, a block means a set of elements such video data or syntax elements relative to video data. For example, a block of pixels is a set of pixels which belong to a picture and the pixel values of a block means the values of the pixels which belong to this block.

A video coding device may attempt to compress video data by taking advantage of spatial and temporal redundancy. For example, a video encoder may take advantage of spatial redundancy by coding a block relative to neighboring, previously coded blocks. Likewise, a video encoder may take advantage of temporal redundancy by coding a block of picture data relative to data of previously coded picture. In particular, the video encoder may predict a current block of video data from data of a spatial neighbor or from data of a previously coded picture. The video encoder may then calculate a residual for the block of video data as a difference between the actual pixel values for the block of video data and the predicted pixel values for the block. Accordingly, the residual for a block may include pixel-by-pixel difference values in the pixel (or spatial) domain.

The video encoder may then apply a transform to the values of the residual to compress energy of the pixel values into a relatively small number of transform coefficients in the frequency domain. The video encoder may then quantize the transform coefficients, scan the quantized transform coefficients to convert a two-dimensional matrix of quantized transform coefficients into a one-dimensional vector including the quantized transform coefficients. The video encoder may then apply an entropy coding process to entropy encode the scanned coefficients. Example entropy coding processes may include, for example, context-adaptive variable length coding (CAVLC), context-adaptive binary arithmetic coding (CABAC), syntax-based context-adaptive binary arithmetic coding (SBAC), probability interval partitioning entropy (PIPE) coding or other entropy encoding methodologies.

A video decoder may perform generally reciprocal techniques to the encoding techniques performed by the video encoder. Although generally reciprocal, the video decoder may, in some instances, perform techniques similar to those performed by the video encoder.

The video encoder may also entropy encode syntax elements associated with the encoded video data for use by a video decoder in decoding the video data. The video decoder may then rely on syntax elements or other data contained in a received bitstream that includes the data described with respect to the video encoder.

According to some examples of syntax elements, the positions of the significant coefficients (i.e., nonzero transform coefficients) in a block of video data may be encoded prior to the values of the transform coefficients, which may be referred to as the "levels" of the transform coefficients. The process of coding the locations of the significant coefficients may be referred to as significance map coding. A significance map (SM) includes a two dimensional array of binary values that indicate locations of significant coefficients.

For example, a SM for a block of video data may include a two-dimensional array of ones and zeros, in which the ones indicate positions of significant transform coefficients within the block and the zeros indicate positions of non-significant (zero-valued) transform coefficients within the block. The ones and zeros are referred to as "significant coefficient flags."

Additionally, in some examples, the SM may include another 2-D array of ones and zeros, in which a one indicates a position of a last significant coefficient within the block according to a scanning order associated with the block, and the zeros indicate positions of all other coefficients within the block. In this case, the ones and zeros are referred to as "last significant coefficient flags."

In other examples, such last significant coefficient flags are not used. Rather, the last significant coefficient in a block may be coded first, before sending the rest of the SM. In any case, SM coding for a block of video data may consume a significant percentage of the video bitrate used to code the block.

After the SM is coded, a video coder may entropy code the level of each transform coefficient. For example, a video coder may convert an absolute value of each non-zero transform coefficient into binary form. In this way, each non-zero transform coefficient may be "binarized," e.g., using a unary code comprising one or more bits, or "bins". A bit for the sign of the transformed coefficient may also be encoded.

In addition, a number of other binarized syntax elements may be included to allow a video decoder to decode the video data. For example, binarized syntax element may represent motion vector residuals, Trnasform Unit coding flags, Coding Group coding flags, transformed coefficient significant flags, transformed coefficient magnitude (greater than 1 and greater than 2) flags, SAO data, etc.

A video coder may entropy code each binary symbol (or bin) for a block of video data, whether corresponding to transform coefficients or syntax element (information) for the block, using probability estimates for each binary symbol. The probability estimates may indicate a likelihood of a binary symbol having a given binary value (e.g., "0" or "1"). The probability estimates may be included within a probability model, also referred to as a "context model." Then, a video coder may determine a context for a binary symbol to be coded and select a probability model from the determined context.

Context, for a binary symbol of a sequence of binary symbols representing a syntax element, may include values of related binary symbols of previously coded neighboring syntax elements.

As one example, the context for each significant coefficient flag of the block includes a type of the block (e.g., block size, block of lum or chroma elements), and a position of a coefficient corresponding to the respective flag within the block according to a scanning order associated with the block.

As another example, the context for a binary symbol of a binarized residual transform coefficient absolute value for the block includes a position of the binary symbol within a unary codeword that represents the absolute value, and values of previously coded coefficients of the block.

In other examples, the context for a binary symbol of a sequence of binary symbols representing a coded block pattern ("CBP") includes values of related binary symbols of previously coded neighboring syntax elements, e.g., on the top and to the left of the current syntax element.

The present principles are not limited to the above examples but extends to any syntax elements and contexts such as defined, for example in the H264 or H265 standards.

In any case, a different probability model is defined for each context.

After having entropy coded a binary symbol, the probability model is updated according to the value of the coded binary symbol to reflect the most current probability estimates.

The binary symbols associated with a block of video data (or syntax elements) may be coded in one or more coding "passes." For example, during a first pass, a video coder may entropy code the SM. During a second pass, the video coder may entropy code a first bin of the transform coefficient levels. The video coder may continue to perform coding passes until all of the information associated with the transform coefficients of a block is coded.

In some examples, the video coder may code the bins of a block of video data (or syntax elements) using a combination of context adaptive and non-context adaptive coding. For example, for one or more passes, the video coder may use a bypass mode to bypass, or omit, the regular arithmetic coding process. In such instances, a fixed equal probability model may be used to code a bypass coded bin. Bypass coded bins do not include context or probability updates.

When performing context adaptive coding, in some examples, there may be relatively high serial dependencies due to multiple feedback loops.

For example, context, which indicates a particular probability model for coding a binary symbol, may be influenced by values of previously coded binary symbols, e.g., related binary symbols of previously coded syntax elements.

In addition, the probability models used to code the binary symbols may also be influenced by values of previously coded binary symbols. That is, the probability models may be maintained as a state in a finite state machine. Each particular state may correspond to a specific probability value. The next state, which corresponds to an update of the probability model, may depend on the value of the current binary symbols (e.g., the bin currently being coded).

In addition, as noted above, a particular probability model may be maintained as a state in a finite state machine, with each particular state corresponding to a specific probability value. The next state, which corresponds to an update of the probability model, may depend on the value of the current binary symbol. Such feedback loops, which may be referred to as state updates, may present a computational bottleneck. For example, it may be difficult to increase throughput due to the dependencies in the feedback loops. That is, one binary symbol may not be processed until the probability model from the previous binary symbol has been updated. In some examples, the same context may be called continuously (binary symbol by binary symbol) with high frequency.

Context-adaptive binary arithmetic coding (CABAC) is a form of entropy encoding used in the H.264/MPEG-4 AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, February 2014) and High Efficiency Video Coding (HEVC) standards (("High Efficiency Video Coding", SERIES H: AUDIOVISUAL AND MULTIMEDIA SYSTEMS, Recommendation ITU-T H.265, Telecommunication Standardization Sector of ITU, April 2013).

CABAC is a lossless compression technique, although the video coding standards in which it is used are typically for lossy compression applications.

FIG. 1 shows a generic block diagram for encoding a syntax element in CABAC.

Basically, CABAC comprises three elementary steps.

In the first step, a binarizer maps a given non-binary valued syntax element to a sequence of binary symbols (bin). When a binary valued syntax element is given, this initial step is bypassed, as shown in FIG. 1.

For each bin of the sequence of binary symbols or for each binary valued syntax element, one or two subsequent steps may follow depending on the coding mode.

In a so-called regular coding mode, in a context selecting stage, a context value is determined depending on previously encoded syntax elements or coded binary symbols. Then, the context value and the value of the binary symbol s are passed to a regular coding engine, where the final stage of arithmetic encoding together with a subsequent context updating takes place base on the probability p of the context value (see FIG. 1).

Alternatively, a so-called bypass coding mode is chosen for binary symbols in order to allow a speedup of the whole encoding (and decoding) process by means of a simplified coding engine without the usage of an explicitly assigned probability model, as illustrated by the lower right branch of the switch in FIG. 1.

FIG. 2 illustrates an example of the context selecting stage when a sequence of binary symbols representing a significance map relative to a block of video data.

This is a non-restricting example because the principles apply to any sequence of binary symbols representing syntax element.

For instance, in HEVC (also so-called H265), among all context/syntax element, there are
the color channel (luma or chroma);
the TU size;
the position of the transformed coefficient;
the neighboring symbol values.

In the example of FIG. 2, a block of binary symbols, representing a block of the significance map, is represented. This block is scanned according to a specific scanning order. For example, the scanning order, illustrated by the dotted lines, starts from the bottom-right corner to the top-left corner of the block. Assuming a binary symbol s to be coded, several contexts $C_i$ are defined for the binary symbol s according to said scanning order and each context $C_i$ is associated with a context value $ContVal_i$.

For example, four contexts $C_i$ are defined for the binary symbol s from two previously coded syntax elements x1 and x2 (significance flags). Each context $C_i$ is defined according to the binary values of x1 and x2 and a specific context value $ContVal_i$ is assigned to each of the context.

As example, illustrated in FIG. 3, a context value comprises a bit valMPS representing a specific binary value, so-called Most Probable Symbols (MPS), of the binary symbol s and bits (e.g. 7 bits) pStatIdx representing a probability p' (or state) from which a probability p is deduced.

According to the values of x1 and x2, a context Cs is selected from the four contexts and the associated context value ContVals is assigned to the binary symbol s.

In the context updating stage, the update of the context value ContVals is made following the process illustrated in FIG. 4 depending on whether or not the binary symbol s equals MPS.

The evolution is made through two tables transIdxMPS (if the binary symbol s is the MPS) and transIdxLPS (if the binary symbol s is not the MPS, i.e. it is the Least Probable Symbol (LPS)). These tables are provided in FIG. 5 for an entry pStateIdx.

Following this example, the probability PMPS of the binary symbol s to be the MPS is quantized linearly on 8 bits, from 0 to 127. It is deduced from the selected context value by $$p_{MPS}=(p'+64)/127=(pStateIdx+64)/127$$

and the probability p of the symbol s to be 1 is deduced obviously from $p_{MPS}$ depending on the value of the MPS.

| | |
|---|---|
| p = $p_{MPS}$ | if MPS = 1, |
| p = 1 − $p_{MPS}$ | if MPS = 0. |

Context-Adaptive coding is a powerful tool that allows to follow dynamically the statistics of the different syntax elements relative to encoded video data.

Thus, using CABAC for entropy coding video data and/or syntax elements relative to video data has led to the extensive use of many contexts in HEVC/H265 (up to several hundreds) in order to model their statistics.

Selecting a context depends on many things, thus it is usual to use a huge number of contexts in order to capture the statistics of the syntax elements (or video data) and thus optimizing the performance of CABAC. However, because the context values associated to the contexts shall be stored in memory for encoding all the binary symbols of one or more sequences of binary symbols, increasing the number of contexts increases the requirement in term of memory and processing complexity. That is why limiting the number of contexts is crucial to ensure efficient hardware implementability of a video decoder implementing CABAC for encoding syntax elements.

One of the challenge is thus to benefit from the increased compression capability provided by CABAC without increasing too much the number of contexts.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for context-adaptive binary arithmetic coding a sequence of binary symbols representing a syntax element related to video data or a syntax element relative to a video data comprising for each binary symbol of the sequence of binary symbols:

obtaining a context value from a context model defined for the binary symbol, said context value comprising bits representing the probability, called a first probability p, for the binary symbol to be equal to a binary value;

determining a second probability p' by modifying said first probability p according to at least one previously coded binary symbol of the sequence of binary symbols;

arithmetic coding the binary symbol based on said second probability p'; and updating and storing the first probability p of said context value according to the coded binary symbol.

According to another of their aspects, the present principles relate to a device for context-adaptive binary arithmetic coding a sequence of binary symbols representing a syntax element related to video data or a syntax element relative to a video data comprising a processor configured to, for each binary symbol of the sequence of binary symbols:

obtain a context value from a context model defined for the binary symbol, said context value comprising bits representing the probability, called a first probability p, for the binary symbol to be equal to a binary value;

determine a second probability p' by modifying said first probability p according to at least one previously coded binary symbol of the sequence of binary symbols;

arithmetic code the binary symbol based on said second probability p'; and update the first probability p of said context value according to the coded binary symbol.

According to an embodiment of the above method or device, the context value further comprises a bit representing a most probable binary value of the binary symbol and the bits represent the first probability p for the binary symbol to be equal to said most probable binary value.

According to an embodiment of the above method or device, determining the second probability p' by modifying the first probability p according to at least one previously coded binary symbol of the sequence of binary symbols comprises:

obtaining a probability adjusting value from a weighted value of said at least one previously coded binary symbol of the sequence of binary symbols;

determining the second probability p' by adding said probability adjusting value to the first probability p.

According to an embodiment of the above method or device, the probability adjusting value is obtained from a weighted value of said at least one previously coded binary symbol of the sequence of binary symbols by:

$$\Delta = \Delta_0 + \sum_{j=A}^{K} w_j f_j$$

where $\Delta_0$ is a constant value, $w_j$ is a weighting value associated with said at least one of previously coded binary symbol of the sequence of binary symbols and $f_j$ is the value of said at least one previously coded binary symbol of the sequence of binary symbols.

According to an embodiment of the above method or device, the probability adjusting value is selected from a set of potential values, each defined according to the values of at least one previously coded binary symbol of the sequence of binary symbols.

According to another of their aspects, the present principles relate to a method for encoding or decoding video data comprising the steps of one of the above method for context-adaptive binary arithmetic coding a sequence of binary symbols representative of said video data.

According to another of their aspects, the present principles relate to a device for encoding or decoding video data or syntax element comprising a processor configured to context-adaptive binary arithmetic code a sequence of binary symbols representative of said video data by:

obtaining a context value from a context model defined for the binary symbol, said context value comprising bits representing the probability, called a first probability p, for the binary symbol to be equal to a binary value;

determining a second probability p' by modifying said first probability p according to at least one previously coded binary symbol of the sequence of binary symbols;

arithmetic coding the binary symbol based on said second probability p'; and updating the first probability p of said context value according to the coded binary symbol.

According to an embodiment of the above method or device, the weighting value associated with a previously coded binary symbol of the sequence of binary symbols depends on the Euclidean distance from the current binary symbol of the sequence of binary symbols to be coded.

According to other of their aspects, the present principles relate to a computer program product comprising program code instructions to execute the steps of the above method when this program is executed on a computer and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

4. BRIEF DESCRIPTION OF DRAWINGS

In the drawings, examples of the present principles are illustrated. It shows:

FIG. 5 shows well-known tables usually used for context value updating;

Similar or same elements are referenced with the same reference numbers.

6. DESCRIPTION OF EXAMPLE OF THE PRESENT PRINCIPLES

Figure 1:
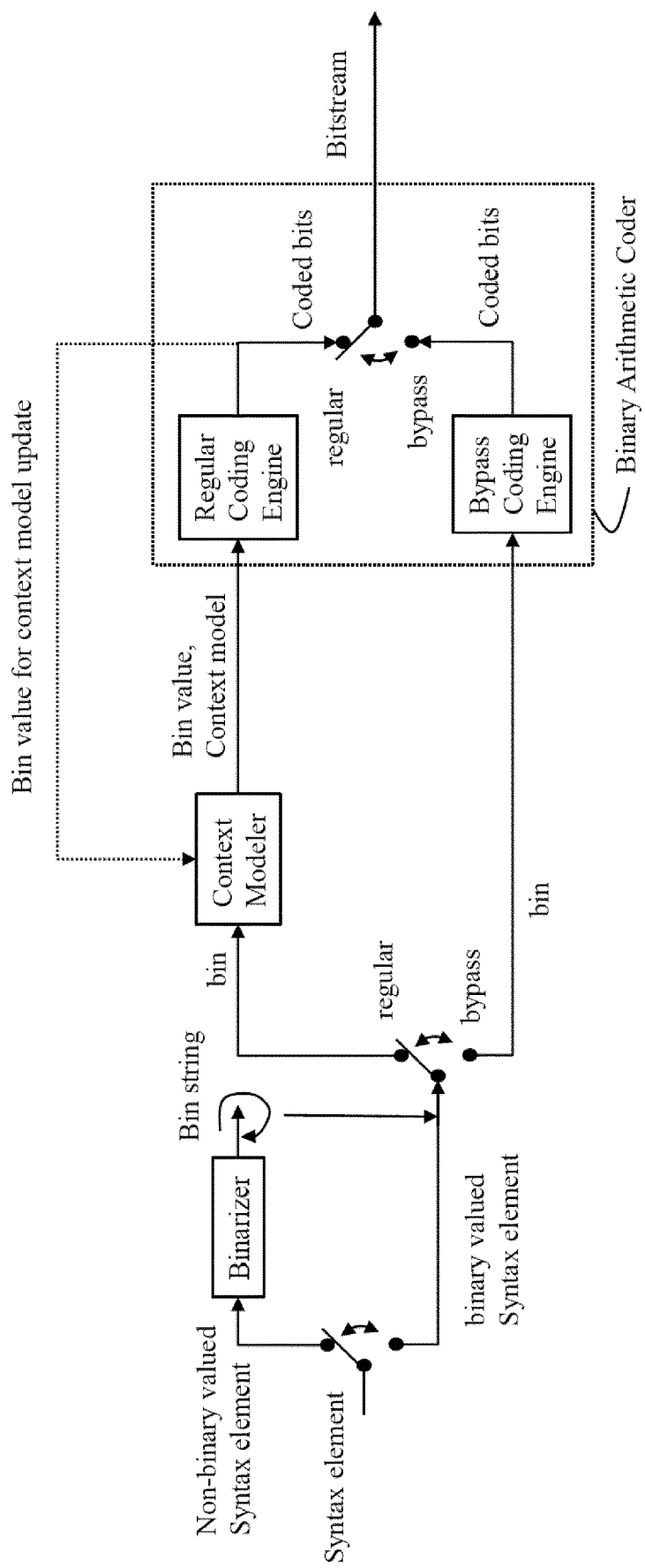
FIG. 1 shows a generic block diagram for encoding a syntax element using CABAC.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or subcombination.

The present principles are described for encoding/decoding a picture but extends to the encoding/decoding of a sequence of pictures (video) because each picture of the sequence is sequentially encoded/decoded as described below.

The present principles disclose a modified version of CABAC in which a single context for a binary symbol is considered, a probability p' is obtained by modifying the probability p included in the context value relative to said single context, instead of selecting a context among a set of potential contexts as in prior art. Next, the modified probability p' of the context value and the value of the binary symbol s are provided to the arithmetic encoding, and the context is updated based on the probability p.

The number of context values to maintain in memory is thus reduced compared to prior art. Then, the number of contexts may be reduced according to the present principles without a significant loss of the usual CABAC performance.

Figure 6:
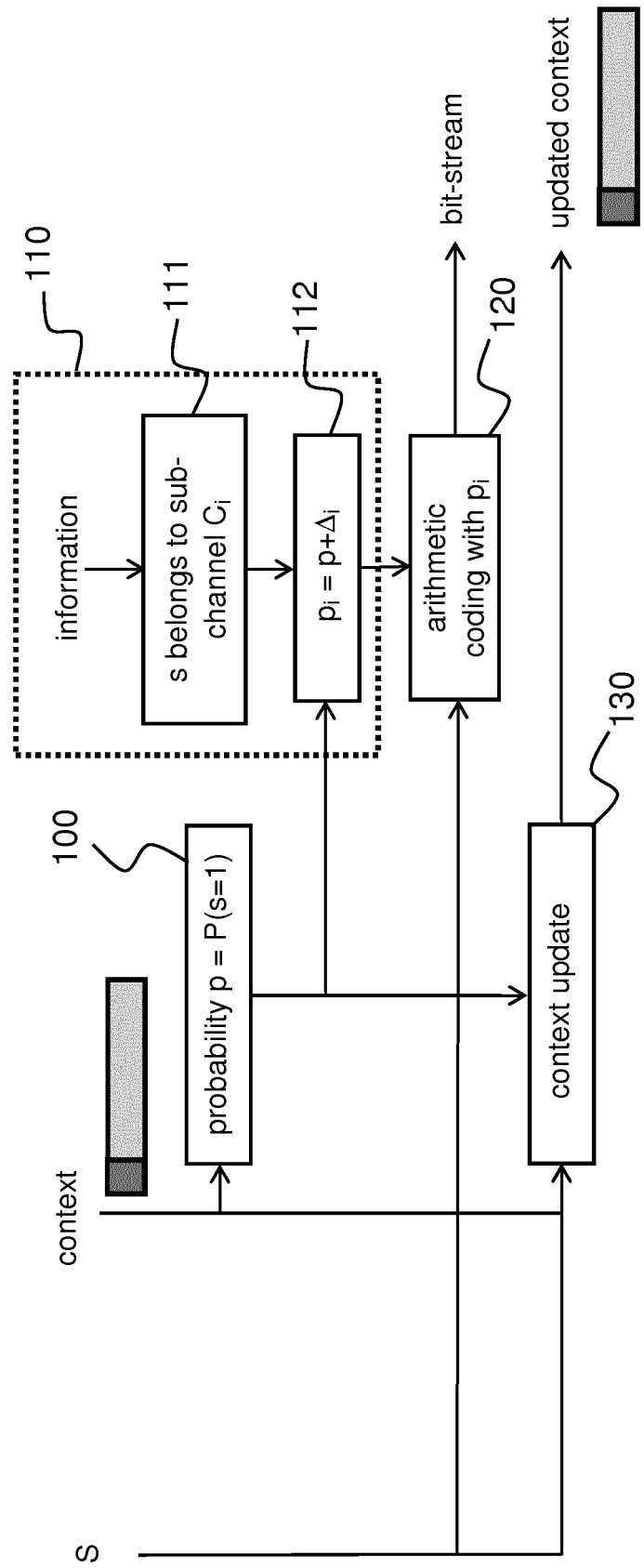
FIG. 6 illustrates a method for context-adaptive binary arithmetic coding a binary symbol s of a sequence of binary symbols in accordance with an example of the present principles.

FIG. 6 illustrates a method for context-adaptive binary arithmetic coding a binary symbol s of a sequence of binary symbols in accordance with an example of the present principles.

In step 100, a context value ContVal is obtained from a context C defined for the binary symbol s.

Figure 3:
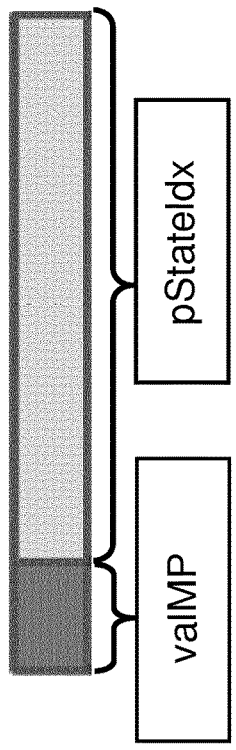
FIG. 3 shows an example of a context value.

As explained above in relation with FIG. 3, said context value ContVal may comprise a bit representing a most probable binary value (MPS) of the binary symbol s and bits representing the probability p for the binary symbol to be equal to said most probable binary value.

According to an embodiment, the context C is selected from a set of potential contexts Ci as explained above in relation with FIG. 1.

According to another embodiment, the single context C is available for a binary symbol s.

In step 110, a probability p' is determined by modifying the probability p according to some information data representative of previously coded image data.

According to an embodiment, the information data is at least one previously coded binary symbol of the sequence of binary symbols.

According to another embodiment, the information data is provided by a finite-state machine that evolves according to the successive coding of binary symbols.

Figure 4:
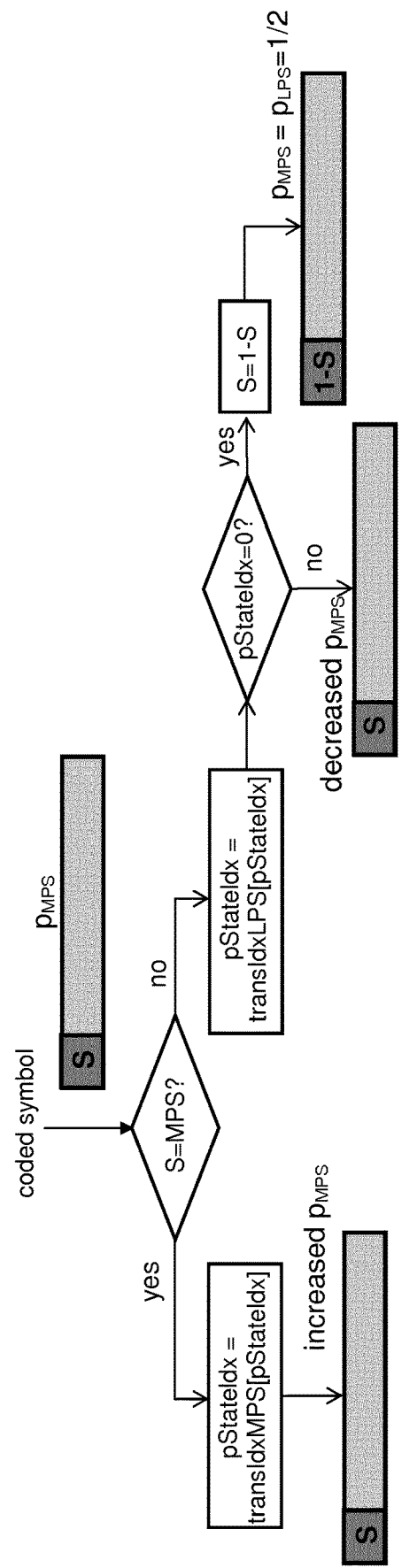
FIG. 4 shows a generic block diagram for updating a context value.

In step 120, the binary symbol is arithmetic coded based on the probability p' and in step 130, the context value ContVal is updated according to the coded binary symbol, i.e. as described in relation with FIG. 4.

According to an embodiment of the step 110, the probability p' is determined by modifying the probability p comprises:

obtaining (step 111) a probability adjusting value $\Delta$ from said at least one previously coded binary symbol of the sequence of binary symbols; and determining (step 112) the probability p' by adding said probability adjusting value to the probability p:

$$p'=P(s=MPS|s \text{ in } C')=p+\Delta$$

where C' is a sub-context defined from at said at least one previously coded syntax element.

Figure 7:
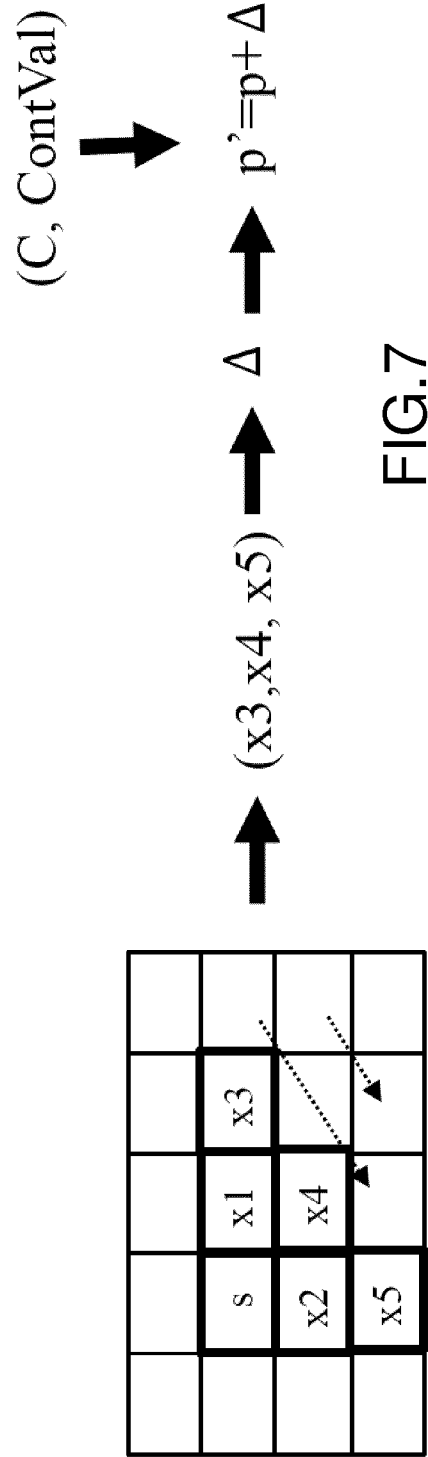
FIG. 7 illustrates an example of an embodiment of the method of FIG. 6 when the binary symbol s represents, for example, a significance flag of a significance map relative to a block of video data.

FIG. 7 illustrates an example of such an embodiment of the method when the binary symbol s represents, for example, a significance flag of a significance map.

Figure 2:
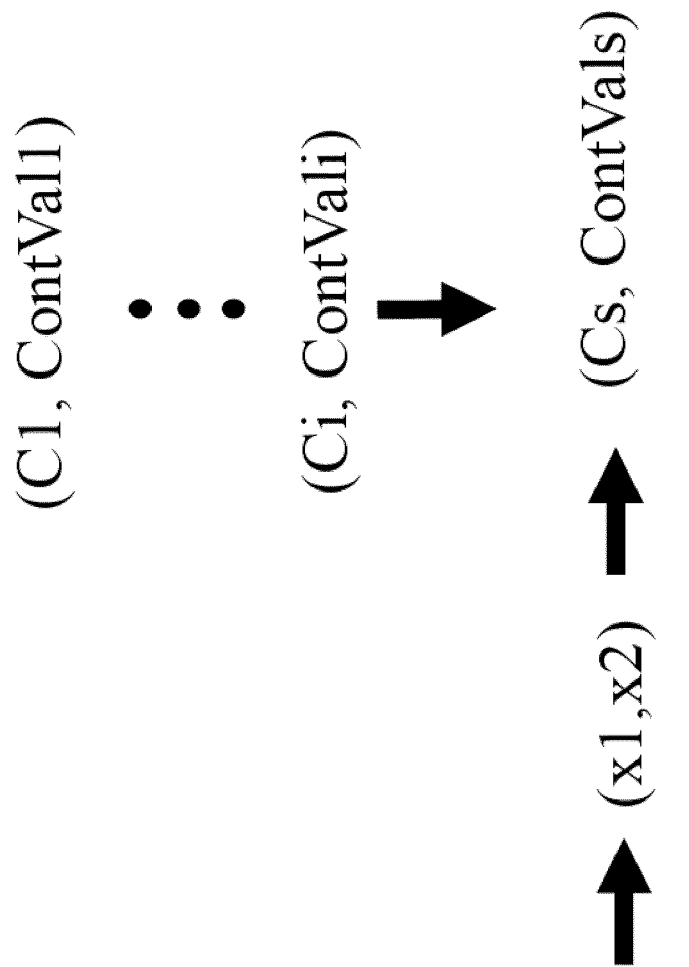
FIG. 2 illustrates an example of the context selecting stage when a sequence of binary symbols representing a significance map relative to a block of video data.

According to this example, a context value Contval is obtained from a context defined by the two coded syntax elements x1 and x2 as defined in relation with FIG. 2.

In step 111, a sub-context C' is defined from at least one other previously coded binary symbol of the sequence of binary symbols, here x3, x4 and x5. The sub-context C' is considered to obtain the adjusting value $\Delta$.

According to an embodiment of the step 111, the probability adjusting value $\Delta$ is obtained by the following equation:

$$\Delta = \Delta_0 + \sum_{j=1}^{K} w_j f_j$$

with $\Delta_0$ is a constant value, $w_j$ is a weighting value associated with one of the K previously coded syntax elements defining the sub-context C' and $f_j$ is the value of said K previously coded syntax element. The constant value $\Delta_0$ may be adjusted such that the expected value, taken over all combinations of the $f_j$'s, of $\Delta$ is close to zero. This ensures that the global statistical behavior of the sub-contexts C' considered together is close to the statistical behavior of the context C.

For example, the weighting value $w_j$ associated with a syntax element xj depends on the Euclidean distance from the binary symbol s.

According to an embodiment of the step 111, the probability adjusting value Δ is a fixed and predetermined value which is selected from a set of potential values, each defined according to the values of at least one previously coded binary symbol of the sequence of binary symbols.

For example, a positive probability adjusting value may be determined when all the x3, x4 and x5 syntax elements equal 1 and a negative value may be determined when all these syntax elements equal 0.

As another example, a positive probability adjusting value may be selected when at least one syntax elements belonging to the sub-context C' equal 1 and a negative probability adjusting value may be selected when at least one syntax elements belonging to the sub-context C' equal 0.

As another example, 8 probability adjusting values may be determined, each according to the percentage of 1 or 0 of the syntax elements x3, x4 and x5.

According to another embodiment of the step 111, the probability adjusting value Δ is selected from a set of potential values, each defined according to the values of at least one previously coded binary symbol of the sequence of binary symbols.

The present principles are not limited to these simple examples which are given only for illustrating purpose.

According to an embodiment, the probability adjusting values may be optimized depending on, for instance, the Quantization Parameter (QP) of the binary symbol to code. For example, by using a test set of video sequences to code at a given QP and testing various values of the weights $w_j$'s, optimized values of said $w_j$'s are determined and hard-coded in the video coder.

Figure 8:
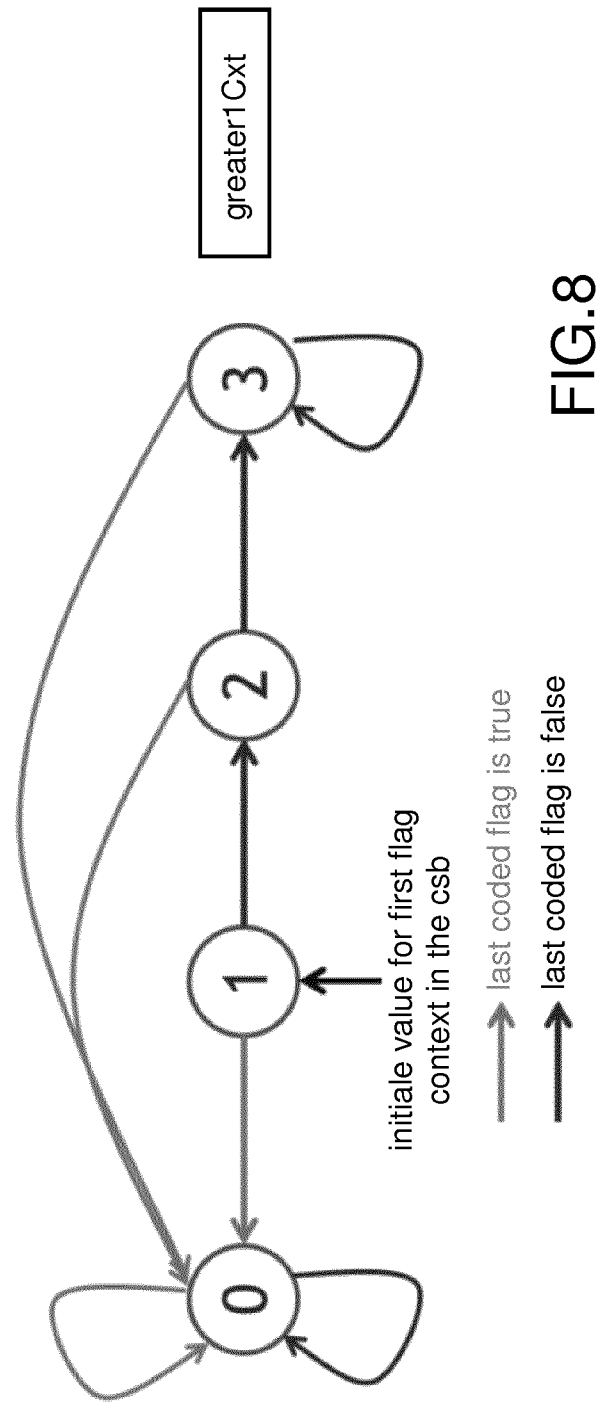
FIG. 8 illustrates an example of the method for context-adaptive binary arithmetic coding a binary symbol s in accordance with an example of the present principles when the binary symbol represents the so-called "greater than one" flag.

FIG. 8 illustrates an example of the method for context-adaptive binary arithmetic coding a binary symbol s in accordance with an example of the present principles when the binary symbol represents the so-called "greater than one" flag, in short greater1 flag, that signals if a transformed coefficient absolute value is strictly greater than one or not. Of course, it applies only to a significant coefficient (i.e. signaled as non-zero by the significance flag).

In the prior art, a context value is chosen among four contexts as described in relation with FIG. 2. A context index is used for determining which of these four contexts is selected. For that, in prior art, the context is initialized to 1 and is updated as follows: As soon as a last coded greater1 flag (syntax element) equals 1 (is true), the context index becomes 0; otherwise the context index is incremented up to 3. The greater1 flag is then encoded based on the probability included in the context value associated with the selected context and the selected context is updates as explained above.

The greater1 flags may be coded using the modified CABAC described in relation with FIG. 6.

In step 100, a context C is chosen among four contexts as described in relation with FIG. 2. A probability p is then obtained from the context value ContVals associated with this context Cs.

A probability adjusting value is then determined according to the at least one previously coded greater1 flag, a modified probability p' is obtained according to said probability adjusting value, the current greater1 flag is coded based on the modified probability p' and the context value ContVals is updated according to the probability p as explained above.

The same method may be applied to the "greater than two" flag.

Figure 9:
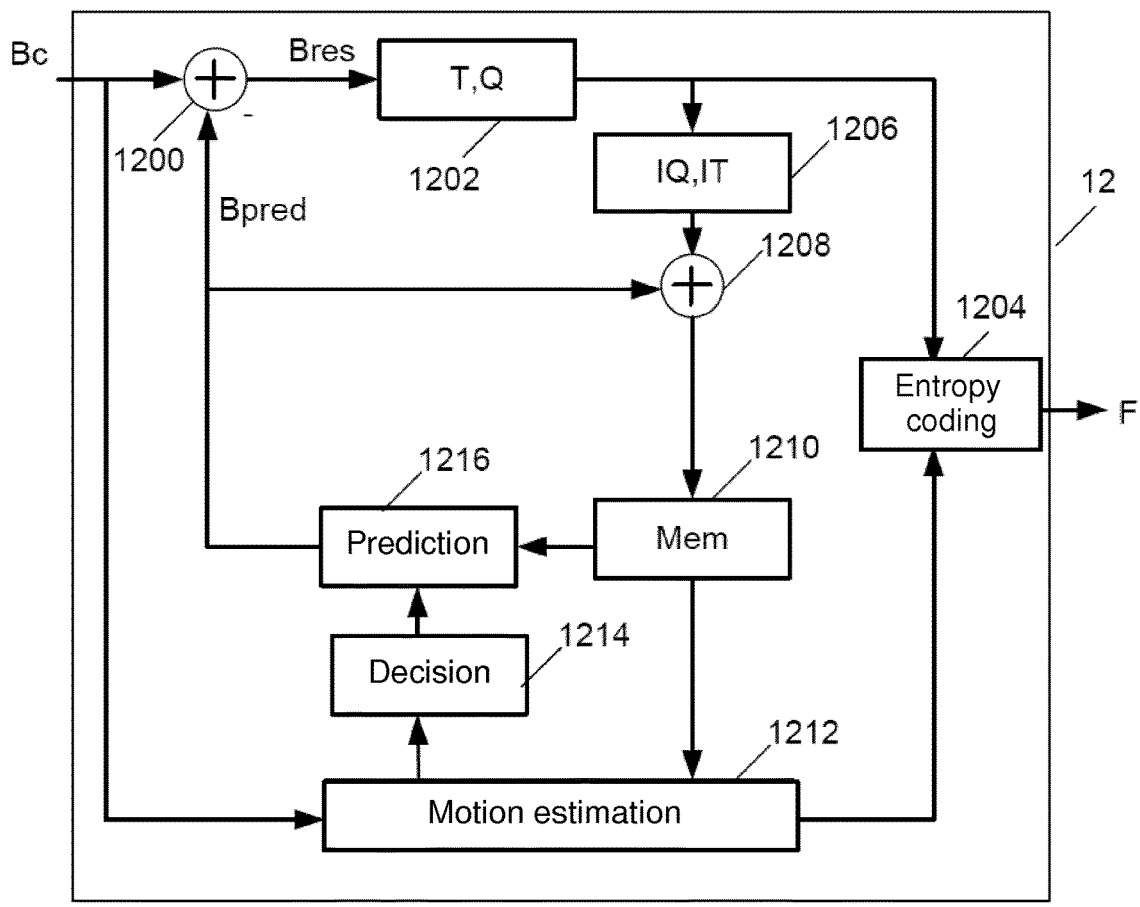
FIG. 9 shows a block diagram of a method for encoding a block of pixels in accordance with the present principles.

FIG. 9 shows a block diagram of a method for encoding a block Bc of video data or syntax element in accordance with the present principles.

Only the functional modules of the method in relation with a temporal prediction based coding (INTER coding) are shown in FIG. 9. The other modules, not shown, which are well-known in prior art, implement for example an INTRA coding with or without spatial prediction.

In step 1200, a module extracts, for example on a pixel base, a prediction block Bpred from the current block Bc to generate a residual block Bres.

In step 1202, a module transforms and quantifies the residual block Bres. The transform T is, for example, a Discrete Cosinus Transform (DCT) or any other block-based transform such a wavelet-based.

In step 1206, a module implements the inverse operations: inverse quantization $Q^{-1}$ followed by an inverse transform $T^{-1}$.

In step 1204, a module entropy encodes the quantified data to a bitstream F of coded data. This module implements the modified CABAC as described in relation with FIGS. 6 and 7.

In step 1208, a module merges, for example on a pixel base, the block outputting the step 1206 and the prediction block Bpred to generate a block of reconstructed video data (or syntax element) which is stored in a memory (step 1210).

In step 1212, a module estimates at least one motion vector between the block of video data Bc and a block of a reference picture Ir stored in a memory (step 1210), this reference picture having been coded and reconstructed.

According to a variant, the motion estimation may be executed between the block of video data Bc and a block of video data of an original reference picture Ic. In that case, the step 1210 is not linked to the step 1212.

According to a well-known process, the motion estimation searches in the reference picture Ir (or Ic) a motion data, such for example a motion vector, in order to minimize an error computed between a block of video data Bc and a block of video data in that reference picture identified by the motion data.

The motion data are then transmitted to a decision module.

In step 12014, the decision module selects a coding mode for the block of video data Bc from a set of determined coding modes. The selected coding mode is for example the coding mode which minimizes a criterion such a rate-distorsion based criterium. However, the present principles are not limited to any process to select a coding mode which may be selected using any other criterium.

The selected coding mode and the motion data are syntax elements which are entropy encoded in the signal F (step 1204).

In step 1216, a module determines the prediction block Bpred from the selected coding mode outputting the decision module (step 1214) and, potentially, from motion data outputting a memory (step 1210 or 1212).

Figure 10:
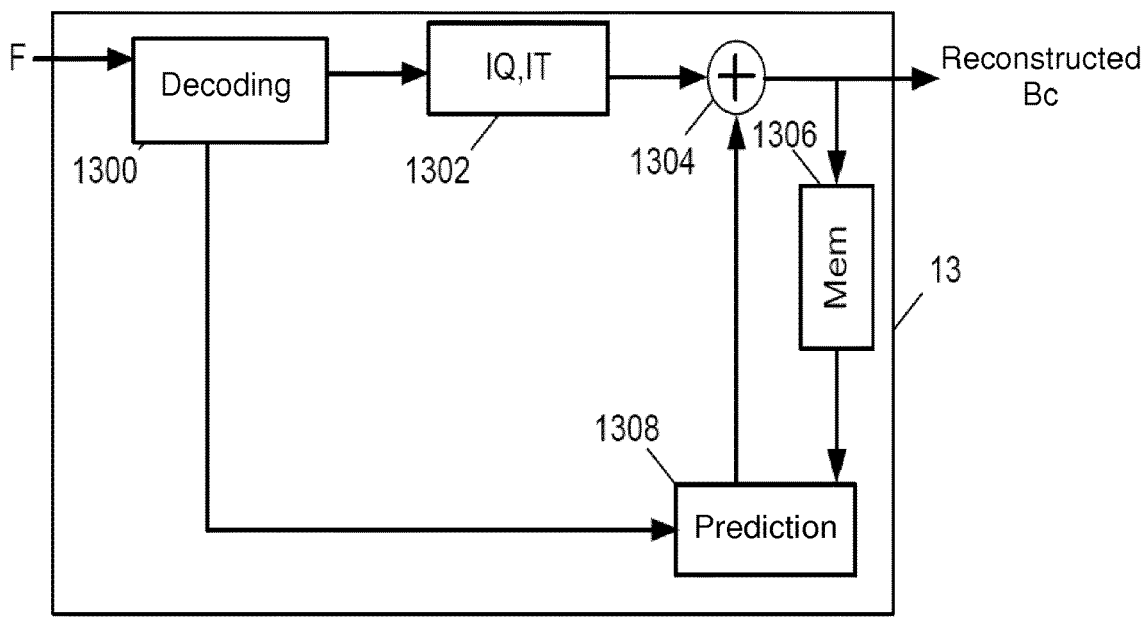
FIG. 10 shows a block diagram of a method for decoding a block of pixels in accordance with the present principles.

FIG. 10 shows an embodiment of a method for decoding a bitstream F of coded video data representing a block of video data.

The bitstream F of coded video data (including syntax elements), for example, has been obtained from a method as described in relation with FIG. 9 and transmitted via a communication path.

In step 1300, a module implements a usual CABAC for entropy decoding, from the bitstream F, residual data relative to coded video data to decode, and syntax elements required for reconstructing the decoded video data for the residual data such coding modes, motion data or significant map for example.

According to a variant, not shown, decoding motion data comprises motion estimating. This solution to decode the motion data may be the so-called template process in the prior art.

The decoded video data relative to the block of pixels to decode are then transmitted to a module (step 1302) which applies an inverse quantizing followed by an inverse transform. The module in step 1302 is identical to the module in step 1206.

The step 1302 is linked to the step 1304 which merges, for example on a pixel by pixel base, the residual block outputting the step 1302 and a prediction block to generate a decoded block of video data Bc (also said reconstructed block) which is then stored in a memory (step 1306).

In step 1308, a module determines a prediction block Bpred from the coding mode extracted from the bistream F for the block of video data to decode, and potentially, from motion data determined outputting the module which reconstructs the motion data.

The decoder described in relation with FIG. 10 is configured to decode video data which have been encoded by the encoder described in relation with FIG. 9.

The encoder (and decoder) is not limited to a specific encoder (decoder).

The encoder (and decoder) is not limited to a specific encoder which may be, for example, an image/video coder with loss like JPEG, JPEG2000, MPEG2, HEVC or H264/AVC standards.

On FIG. 1-10, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 11:
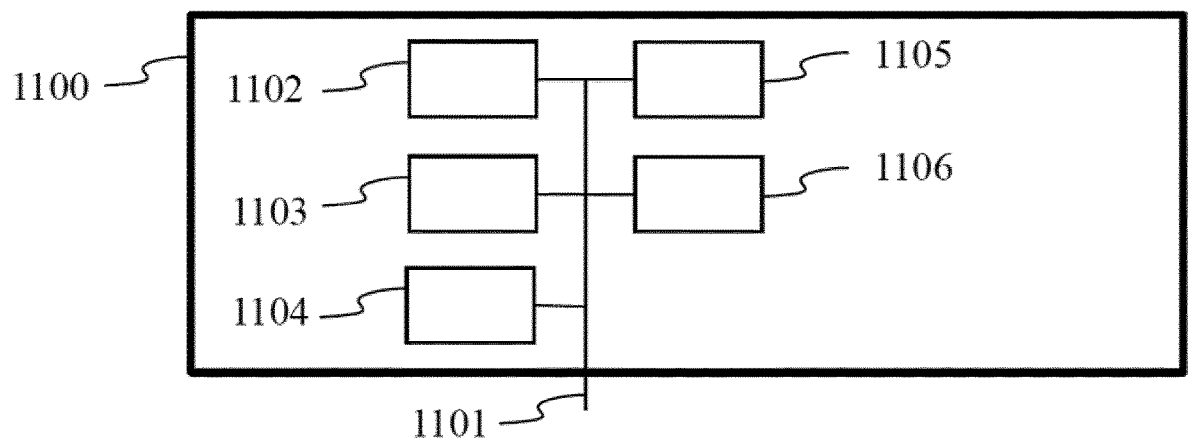
FIG. 11 shows an example of an architecture of a device in accordance with an example of present principles.

FIG. 11 represents an exemplary architecture of a device 1100 which may be configured to implement a method described in relation with FIG. 1-10.

Device 1100 comprises following elements that are linked together by a data and address bus 1101:
- a microprocessor 1102 (or CPU), which is, for example, a DSP (or Digital Signal Processor);
- a ROM (or Read Only Memory) 1103;
- a RAM (or Random Access Memory) 1104;
- an I/O interface 1105 for reception of data to transmit, from an application; and
- a battery 1106

In accordance with an example, the battery 1106 is external to the device. In each of mentioned memory, the word «register» used in the specification can correspond to area of small capacity (some bits) or to very large area (e.g. a whole program or large amount of received or decoded data). The ROM 1103 comprises at least a program and parameters. The ROM 1103 may store algorithms and instructions to perform techniques in accordance with present principles. When switched on, the CPU 1102 uploads the program in the RAM and executes the corresponding instructions.

RAM 1104 comprises, in a register, the program executed by the CPU 1102 and uploaded after switch on of the device 1100, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the block Bc of video data or syntax element or the sequence of binary symbols is obtained from a source. For example, the source belongs to a set comprising:
- a local memory (1103 or 1104), e.g. a video memory or a RAM (or Random Access Memory), a flash memory, a ROM (or Read Only Memory), a hard disk;
- a storage interface (1105), e.g. an interface with a mass storage, a RAM, a flash memory, a ROM, an optical disc or a magnetic support;
- a communication interface (1105), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded data is sent to a destination; specifically, the destination belongs to a set comprising:
- a local memory (1103 or 1104), e.g. a video memory or a RAM, a flash memory, a hard disk;
- a storage interface (1105), e.g. an interface with a mass storage, a RAM, a flash memory, a ROM, an optical disc or a magnetic support;
- a communication interface (1105), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the bitstream F is sent to a destination. As an example, the bitstream F is stored in a local or remote memory, e.g. a video memory (1104) or a RAM (1104), a hard disk (1103). In a variant, the bitstream is sent to a storage interface (1105), e.g. an interface with a mass storage, a flash memory, ROM, an optical disc or a magnetic support and/or transmitted over a communication interface (1105), e.g. an interface to a point to point link, a communication bus, a point to multipoint link or a broadcast network.

In accordance with examples of decoding or decoder, the bitstream F is obtained from a source. Exemplarily, the bitstream is read from a local memory, e.g. a video memory (1104), a RAM (1004), a ROM (1103), a flash memory (1103) or a hard disk (1103). In a variant, the bitstream is received from a storage interface (1105), e.g. an interface with a mass storage, a RAM, a ROM, a flash memory, an optical disc or a magnetic support and/or received from a communication interface (1105), e.g. an interface to a point to point link, a bus, a point to multipoint link or a broadcast network.

In accordance with examples, device 1100 being configured to implement an encoding method described in relation with FIG. 1-9, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 1100 being configured to implement a decoding method described in relation with FIG. 10, belongs to a set comprising:
- a mobile device;
- a communication device;
- a game device;
- a set top box;
- a TV set;
- a tablet (or tablet computer);
- a laptop;
- a display and
- a decoding chip.

Figure 12:
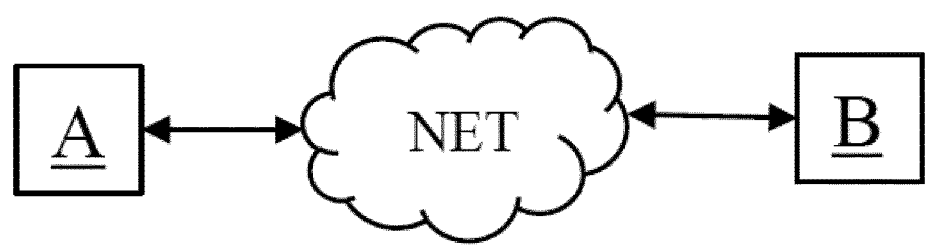
FIG. 12 shows two remote devices communicating over a communication network in accordance with an example of present principles.

According to an example of the present principles, illustrated in FIG. 12, in a transmission context between two remote devices A and B over a communication network NET, the device A comprises a processor in relation with memory RAM and ROM which are configured to implement a method for encoding a picture as described in relation with the FIG. 9 and the device B comprises a processor in relation with memory RAM and ROM which are configured to implement a method for decoding as described in relation with FIG. 10.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
encoding video data, including context-adaptive binary arithmetic coding a sequence of binary symbols representative of the video data, comprising for each binary symbol of the sequence of binary symbols:
obtaining a context value from a context model for a binary symbol, the context value comprising bits representing a first probability for the binary symbol to be equal to a binary value;
first modifying the first probability according to at least one previously coded binary symbol of the sequence of binary symbols, before arithmetic coding of the binary symbol, wherein the first modifying provides a second probability;
arithmetic coding the binary symbol based on the second probability;
second modifying the first probability according to the arithmetically coded binary symbol; and
storing a result of the second modifying of the first probability.

2. The method of claim 1, wherein the context value further comprises a bit representing a most probable binary value of the binary symbol and the bits represent the first probability for the binary symbol to be equal to the most probable binary value.

3. The method of claim 1, wherein the first modifying of the first probability according to at least one previously coded binary symbol of the sequence of binary symbols comprises:
obtaining a probability adjusting value from a weighted value of the at least one previously coded binary symbol of the sequence of binary symbols;
determining the second probability by adding the probability adjusting value to the first probability.

4. The method of claim 3, wherein the probability adjusting value is obtained from a weighted value of the at least one previously coded binary symbol of the sequence of binary symbols by:

$$\Delta = \Delta_0 + \sum_{j=1}^{K} w_j f_j$$

where $\Delta_0$ is a constant value, $w_j$ is a weighting value associated with one of K previously coded binary symbols of the sequence of binary symbols and $f_j$ is the value of the one of K previously coded binary symbols of the sequence of binary symbols.

5. The method of claim 3, wherein the probability adjusting value is selected from a set of potential values, each defined according to the values of at least one previously coded binary symbol of the sequence of binary symbols.

6. A device comprising:
a processor; and
a memory comprising instructions operative, when executed by the processor, to cause the device to encode video data, including context-adaptive binary arithmetic coding a sequence of binary symbols representative of the video data, by, for each binary symbol of the sequence of binary symbols:
obtaining a context value from a context model for a binary symbol, the context value comprising bits representing a first probability for the binary symbol to be equal to a binary value;
first modifying the first probability according to at least one previously coded binary symbol of the sequence of binary symbols, before arithmetic coding of the binary symbol, wherein the first modifying provides a second probability;
arithmetic coding the binary symbol based on the second probability;
second modifying the first probability according to the arithmetically coded binary symbol; and
storing a result of the second modifying of the first probability.

7. A non-transitory computer-readable storage medium comprising instructions that are operative, when executed by a processor, to cause the processor to encode video data, including context-adaptive binary arithmetic coding a sequence of binary symbols representative of the video data, by, for each binary symbol of the sequence of binary symbols:
obtaining a context value from a context model for a binary symbol, the context value comprising bits representing a first probability for the binary symbol to be equal to a binary value;
first modifying the first probability according to at least one previously coded binary symbol of the sequence of binary symbols, before arithmetic coding of the binary symbol, wherein the first modifying provides a second probability;
arithmetic coding the binary symbol based on the second probability;
second modifying the first probability according to the arithmetically coded binary symbol; and
storing a result of the second modifying of the first probability.

8. The device of claim 6, wherein the context value further comprises a bit representing a most probable binary value of the binary symbol and the bits represent the first probability for the binary symbol to be equal to the most probable binary value.

9. The device of claim 6, wherein the first modifying of the first probability according to at least one previously coded binary symbol of the sequence of binary symbols comprises:
obtaining a probability adjusting value from a weighted value of the at least one previously coded binary symbol of the sequence of binary symbols;
determining the second probability by adding the probability adjusting value to the first probability.

10. The device of claim 9, wherein the probability adjusting value is obtained from a weighted value of the at least one previously coded binary symbol of the sequence of binary symbols by:

$$\Delta = \Delta_0 + \sum_{j=1}^{K} w_j f_j$$

where $\Delta_0$ is a constant value, $w_j$ is a weighting value associated with one of K previously coded binary symbols of the sequence of binary symbols and $f_j$ is a value of the one of K previously coded binary symbols of the sequence of binary symbols.

11. The device of claim 8, wherein the probability adjusting value is selected from a set of potential values, each defined according to the values of at least one previously coded binary symbol of the sequence of binary symbols.

12. A method comprising:
decoding video data including context-adaptive binary arithmetic decoding a sequence of binary symbols representative of the video data, by, for each binary symbol of the sequence of binary symbols:
obtaining a context value from a context model for a binary symbol, the context value comprising bits representing a first probability for the binary symbol to be equal to a binary value;
first modifying the first probability according to at least one previously decoded binary symbol of the sequence of binary symbols, before arithmetic decoding of the binary symbol, wherein the first modifying provides a second probability;
arithmetic decoding the binary symbol based on the second probability;
second modifying the first probability according to the arithmetically decoded binary symbol; and
storing a result of the second modifying of the first probability.

13. A device comprising:
a processor; and
a memory comprising instructions operative, when executed by the processor, to cause the device to decode video data, including context-adaptive binary arithmetic decoding a sequence of binary symbols representative of the video data, by, for each binary symbol of the sequence of binary symbols:
obtaining a context value from a context model for a binary symbol, the context value comprising bits representing a first probability for the binary symbol to be equal to a binary value;
first modifying the first probability according to at least one previously decoded binary symbol of the sequence of binary symbols, before arithmetic decoding of the binary symbol, wherein the first modifying provides a second probability;
arithmetic decoding the binary symbol based on the second probability; and
second modifying the first probability according to the arithmetically decoded binary symbol; and
storing a result of the second modifying of the first probability.

14. A non-transitory computer-readable storage medium comprising instructions that are operative, when executed by a processor, to cause the processor to decode video data including context-adaptive binary arithmetic decoding a sequence of binary symbols representative of the video data, by, for each binary symbol of the sequence of binary symbols:
obtaining a context value from a context model for a binary symbol, the context value comprising bits representing a first probability for the binary symbol to be equal to a binary value;
first modifying the first probability according to at least one previously decoded binary symbol of the sequence of binary symbols, before arithmetic decoding of the binary symbol, wherein the first modifying provides a second probability;
arithmetic decoding the binary symbol based on the second probability;
second modifying the first probability according to the arithmetically decoded binary symbol; and
storing a result of the second modifying of the first probability.

15. The device of claim 13, wherein the context value further comprises a bit representing a most probable binary value of the binary symbol and the bits represent the first probability for the binary symbol to be equal to the most probable binary value.

16. The device of claim 13, wherein the first modifying of the first probability according to at least one previously decoded binary symbol of the sequence of binary symbols comprises:
obtaining a probability adjusting value from a weighted value of the at least one previously decoded binary symbol of the sequence of binary symbols;
determining the second probability by adding the probability adjusting value to the first probability.

17. The device of claim 16, wherein the probability adjusting value is obtained from a weighted value of the at least one previously decoded binary symbol of the sequence of binary symbols by:

$$\Delta = \Delta_0 + \sum_{j=1}^{K} w_j f_j$$

where $\Delta_0$ is a constant value, $w_j$ is a weighting value associated with one of K previously decoded binary symbols of the sequence of binary symbols and $f_j$ is a value of the one of K previously decoded binary symbols of the sequence of binary symbols.

18. The device of claim 16, wherein the probability adjusting value is selected from a set of potential values, each defined according to the values of at least one previously decoded binary symbol of the sequence of binary symbols.

19. The method of claim 1, wherein the at least one previously coded binary symbol of the sequence of binary symbols defines a sub-context, and the second probability is a probability that the binary symbol is equal to a binary value for the sub-context.

20. The device of claim 6, wherein the at least one previously coded binary symbol of the sequence of binary symbols defines a sub-context, and the second probability is a probability that the binary symbol is equal to a binary value for the sub-context.

21. The method of claim 12, wherein the first modifying of the first probability according to at least one previously decoded binary symbol of the sequence of binary symbols comprises:
obtaining a probability adjusting value from a weighted value of the at least one previously decoded binary symbol of the sequence of binary symbols;
determining the second probability by adding the probability adjusting value to the first probability.

* * * * *